United States Patent [19]

Tanaka et al.

[11] Patent Number: 4,777,251
[45] Date of Patent: Oct. 11, 1988

[54] PROCESS FOR PREPARING OXYTITANIUM PHTHALOCYANINE

[75] Inventors: Motoaki Tanaka, Urawa; Tutomu Miyagawa, Kawagoe; Iwao Takagishi, Yokohama, all of Japan

[73] Assignees: Mitsubishi Kasei Corporation; Waco Pure Chemical Industries, Ltd., both of Japan

[21] Appl. No.: 43,047

[22] Filed: Apr. 27, 1987

[30] Foreign Application Priority Data

Apr. 30, 1986 [JP] Japan .................................. 61-98283

[51] Int. Cl.$^4$ .......................................... C09B 47/067
[52] U.S. Cl. ...................................... 540/143; 540/141
[58] Field of Search .................................. 540/141, 143

[56] References Cited

U.S. PATENT DOCUMENTS 4,664,997  5/1987  Suzuki et al. .................. 540/141 X
4,701,396  10/1987  Hung et al. ..................... 540/141 X

FOREIGN PATENT DOCUMENTS 180930  5/1986  European Pat. Off. .
180931  5/1986  European Pat. Off. .

*Primary Examiner*—Richard L. Raymond
*Attorney, Agent, or Firm*—David G. Conlin

[57] ABSTRACT

An improved process for preparing oxytitanium phthalocyanine is provided wherein the condensation reaction of o-phthalodinitrile with titanium tetrachloride is effected in an organic solvent at 170° to 300° C. followed by hydrolysis, the improvement wherein said organic solvent is preliminarily heated at a temperature of 160° to 300° C. prior to initiation of the condensation reaction. The A form of oxytitanium phthalocyanine crystal can selectively be produced in the pure state.

12 Claims, 5 Drawing Sheets

PROCESS FOR PREPARING OXYTITANIUM PHTHALOCYANINE

BACKGROUND OF THE INVENTION

1. Field of the Invention:

The present invention relates to a process for preparing oxytitanium phthalocyanine. More particularly, it relates to a process for preparing a specific crystal form of oxytitanium phthalocyanine.

2. Description of the Prior Art:

Phthalocyanines are known compounds useful as colorants for paints, printing inks and resins, or as electronic materials. In particular, they have been utilized as photosensitive materials in electrophotography on an extensive scale.

The present inventors have studied processes for preparing oxytitanium phthalocyanine in great detail and found that oxytitanium phthalocyanine exists in three different crystal forms, hereinafter referred to as "A form", "B form" and "C form", respectively, depending upon subtle differences of conditions for preparing oxytitanium phthalocyanine.

FIGS. 1 to 3 show the powder X-ray diffraction patterns of said three crystal forms of oxytitanium phthalocyanine, respectively. Strong, characteristic diffraction peaks are seen at Bragg angles ($2\theta$) of 9.3° and 26.3° for the A form (FIG. 1), at 7.6° and 28.6° for the B form (FIG. 2), and at 7.0° and 15.6° for the C form (FIG. 3).

Generally, oxytitanium phthalocyanne is obtained in the form of a mixture of the above said crystal forms. Such a mixture may readily cause difficulties due to the non-uniformity in physical properties of each of the crystal forms since they have different physical properties from one another.

Of course, it is generally desirable to prepare oxytitanium phthalocyanine in a pure crystal form.

In practice, oxytitanium phthalocyanine is often dispersed in various polymers or solvents, applied on base materials such as polyester films and dried so as to manufacture commercially available articles. However, since the interaction between oxytitanium phthalocyanine and various polymers or solvents varies with different crystal forms, the use of mixtures of two or more crystal forms of oxytitanium phthalocyanine often interferes with the dispersibility of the crystals in polymers or solvents resulting in a failure in obtaining predicted physical properties.

Thus, the development of a process for preparing a pure crystal form of oxytitanium phthalocyanine is eagerly desired in order to eliminate such defects as encountered by the prior art.

Among three aforementioned crystal forms of oxytitanium phthalocyanine, the A form is especially useful as a photo-conductive material in electrophotography.

The present inventors have made great efforts to obtain the pure A form crystal of oxytitanium phthalocyanine and finally found that under certain specific conditions, only the A form of oxytitanium phthalocyanine can selectively be produced. Thus, the present inventors have now attained this invention.

SUMMARY OF THE INVENTION

It is therefore an object of this invention to provide an improved process for preparing oxytitanium phthalocyanine in a pure crystal form.

Another object of this invention is to provide a new process for preparing the A form of oxytitanium phthalocyanine.

Other objects and advantages of this invention will be apparent from the following description.

According to the present invention, there is provided an improved process for preparing oxytitanium phthalocyanine, which comprises effecting condensation reaction of o-phthalodinitrile with titanium tetrachloride in an organic solvent at a temperature of 170° to 300° C. followed by hydrolysis, the improvement wherein said organic solvent is at a temperature of 160° to 300° C. when o-phthalodinitrile and titanium tetrachloride are brought into contact.

DESCRIPTION OF THE INVENTION

Figure 1:
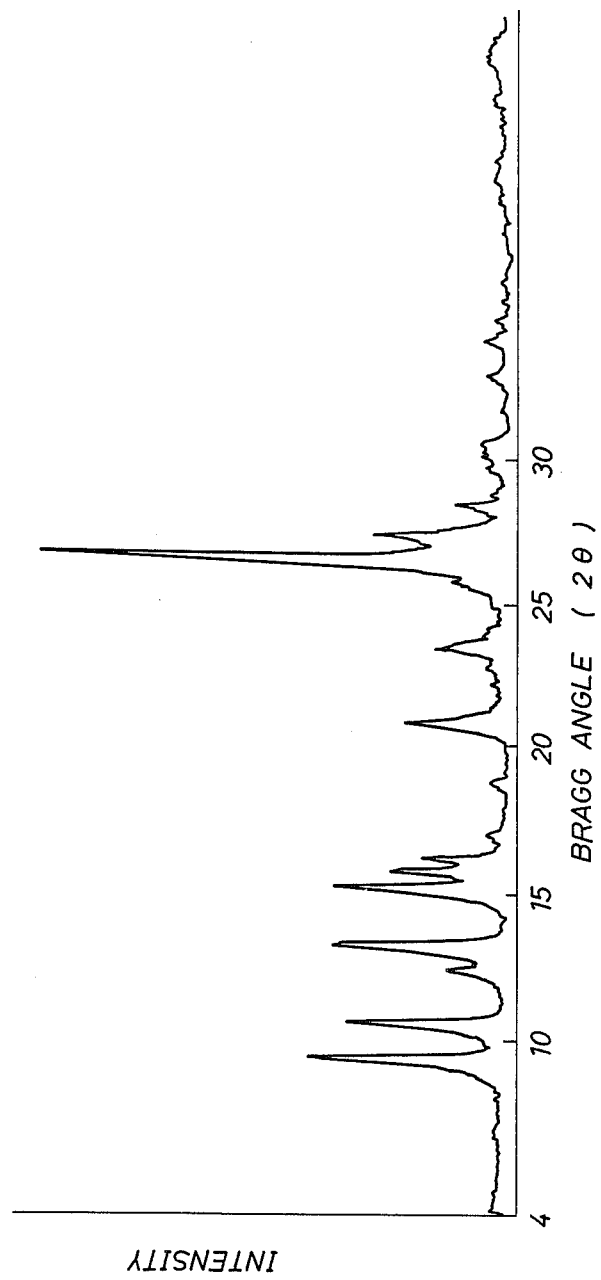
FIG. 1 illustrates the X-ray diffraction pattern of the "A form" crystal of oxytitanium phthalocyanine, which is the crystal form produced using the method of the present invention.
Figure 2:
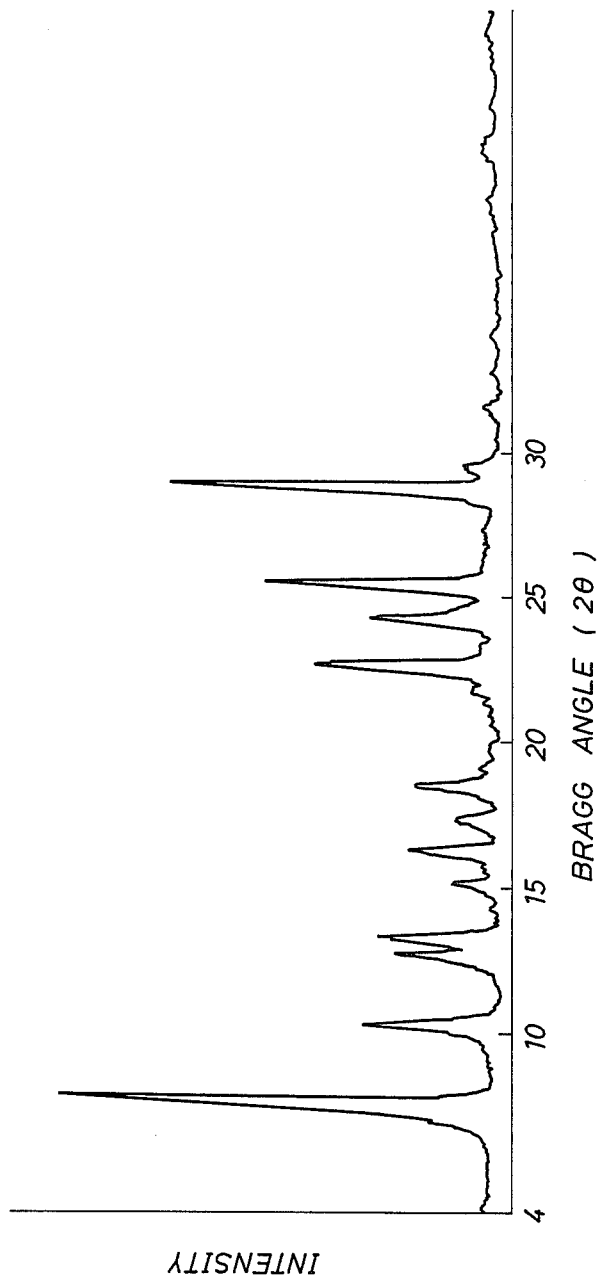
FIG. 2 illustrates the X-ray diffraction pattern of the "B form" crystal of oxytitanium phthalocyanine.
Figure 3:
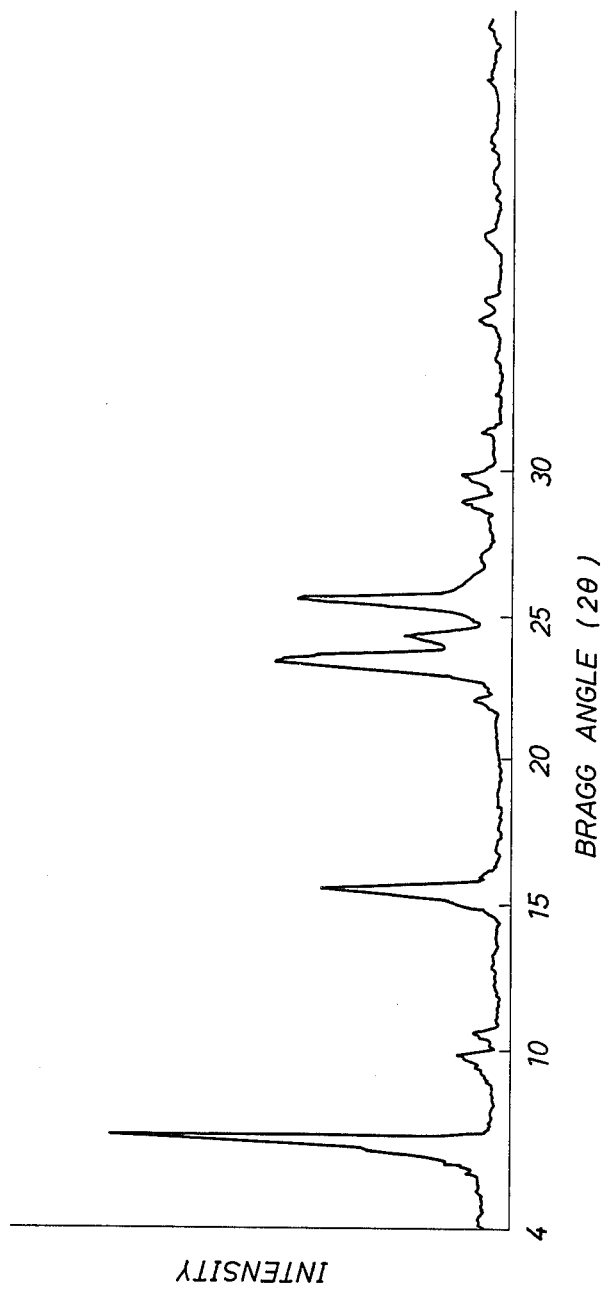
FIG. 3 illustrates the X-ray diffraction pattern of the "C form" crystal of oxytitanium phthalocyanine.

Generally, in conventional processes for preparing oxytitanium phthalocyanine, condensation reaction of o-phthalodinitrile with titanium tetrachloride is effected in an organic solvent at a temperature of 170° to 300° C., and the resulting dichlorotitanium phthalocyanine is filtered off while hot followed by hydrolysis, as shown in the following equation:

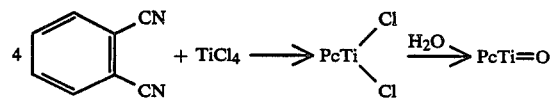

The present inventors have extensively investigated the condensation reaction and, as a result, found that the timing of adding the reagents is an important factor for determining the crystal form of oxytitanium phthalocyanine to be obtained by the reaction.

Thus, the present inventors have now found that the A form of crystalline oxytitanium phthalocyanine can be selectively obtained if the process is devised in such a manner that o-phthalodinitrile and titanium tetrachloride should be brought into contact with each other in a relatively high temperature range.

Specifically, a significantly larger amount of an organic solvent to be used as a condensation reaction medium is preheated to a certain temperature prior to the reaction and the reagents, i.e., o-phthalodinitrile and titanium tetrachloride, are brought into contact with each other in said preheated solvent.

More specifically, according to this invention, the A form of oxytitanium phthalocyanine can very easily be obtained by performing the condensation reaction in any of the following manners:

(1) o-phthalodinitrile and titanium tetrachloride are added to an organic solvent preliminarily heated at 160° to 300° C., preferably 170° to 300° C., more preferably 170° to 250° C., and the reaction is then carried out at 170° to 300° C., preferably 170° to 250° C.;

(2) titanium tetrachloride is added to a mixture of an organic solvent and o-phthalodinitrile, which has preliminarily been heated at 160° to 300° C., preferably 170° to 300° C., more preferably 170° to 250° C., and the reaction is then carried out at 170° to 300° C., preferably 170° to 250° C.;

(3) a mixture of titanium tetrachloride with a small amount of an organic solvent is added to a mixture of an organic solvent and o-phthalodinitrile, which has preliminarily been heated whereby the temperature of said mixture after the addition becomes 160° to 300° C., preferably 170° to 300° C., more preferably 170° to 250° C., and the reaction is then carried out at 170 to 300° C., preferably 170 to 250° C.; or (4) o-phthalodinitrile is added to a mixture of an organic solvent and titanium tetrachloride, which has preliminarily been heated at 160° to 300° C., preferably 170° to 300° C., more preferably 170° to 250° C., and the reaction is then carried out at 170° to 300° C., preferably 170° to 250° C. Further, the method (3) has an additional advantage of preventing the hydrolysis of titanium tetrachloride, which has a very high hygroscopicity.

The temperature at which the condensation reaction is carried out may suitably be selected from the range of 170° to 300° C. Temperatures within the range of 170° to 250° C. are preferred. Too low reaction temperatures will readily give the B form crystal and require longer periods of reaction time. On the other hand, too high reaction temperatures may cause some degradation of the reaction solvent and product. Accordingly, those temperatures lower than 170° C. or higher than 300° C. should be avoided in this invention.

Any molar ratio of o-phthalodinitrile to titanium tetrachloride charged into the reaction vessel may be employed in the invention. However, the molar ratio of approximately 4:1 is preferred herein. It may be desirable to avoid use of molar ratios other than approximately 4:1, since such lower or higher ratios may effect some disadvantages such as reduction in reaction yields and inconvenient recovery of unreacted reactants although the object of this invention may be attained.

Any organic solvent may be used in the condensation reaction. Organic solvents having a boiling point of 170° C. or higher are preferred in this invention. Illustrative examples of such solvents may include, for example, substituted naphthalenes such as α-chloronaphthalene, β1-chloronaphthalene, α-bromonaphthalene, α-methylnaphthalene, α-methoxynaphthalene, etc.; diphenyl ethers such as diphenyl ether, 4,4'-dichlorodiphenyl ether, 3,3'-dimethyldiphenyl ether, etc.; diphenylmethanes such as diphenylmethane, 4,4'-dimethyldiphenylmethane, 3,3'-dichlorodiphenylmethane, etc.; and the like. Other organic solvents having a boiling pointless than 170° C., exemplified by toluene, dichlorobenzene, ethylbenzene, etc., may also be employed herein. In such cases, however, the reaction must be carried out under pressure and therefore requires complicated reaction apparatus and/or operations. Thus, such organic solvents having a boiling point of 170° C. or higher as described above are preferred in the invention.

Such an organic solvent may be used in an amount of 2 to 15 times, preferably 5 to 10 times larger than that of o-phthalodinitrile. With an amount lower than this range, the reaction medium will be too viscous and it will be difficult to stir and mix homogeneously. Amounts larger than the range will lower the yield per unit volume and accordingly be economically disadvantageous, although the reaction may then proceed well.

After the condensation reaction of α-phthalodinitrile with titanium tetrachloride, the product dichlorotitanium phthalocyanine may be hydrolyzed by treatment with hot water in a conventional manner. Preferably, the hot water treatment may be repeated until the pH reaches 5 to 7. More preferably, after the hot water treatment, heat treatment in an organic solvent such as quinoline, α-chloronaphthalene, N-methylpyrrolidone, and the like may be carried out to afford oxytitanium phthalocyanine having better physical properties.

According to this invention, the A form of pure oxytitanium phthalocyanine crystal is selectively obtained as shown in Examples mentioned below. In addition, the process of this invention is highly reproducible. For example, in order to investigate the reproducibility of the present process, ten experiments were done under the same conditions: that is, predetermined amounts of o-phthalodinitrile and titanium tetrachloride were added to α-chloronaphthalene which had been preheated at 160° C., then the mixture was further heated to 200° C., and thereafter the reaction was carried out at 200° C. for 5 hours. The results showed that the pure A form crystal was always obtained in all ten experiments. Thus, the very good reproducibility of the present process has been proved.

On the other hand, the B form crystal or a mixture of the A and B forms of crystal are often obtained in the conventional processes, for instance, by mixing the starting materials, i.e., o-phthalodinitrile and titanium tetrachloride, with an organic solvent which has not been preheated, and thereafter heating and reacting the mixture. Thus, it is difficult to stably prepare the pure A form crystal of oxytitanium phthalocyanine by such known conventional processes different from the present process.

To further illustrate the advantageous utility of the present process, a series of experiments was performed: thus, predetermined amounts of o-phthalodinitrile and titanium tetrachloride were added to α-chloronaphthalene at 25° C., the mixture was then heated to 170° C. in different heating periods, and thereafter the mixture was reacted at 200° C. for 5 hours to prepare oxytitanium phthalocyanine. The results are shown in FIG. 4, in which the production rate of "A form crystal" indicated in the ordinate is defined by the following equation:

Production rate (%) of "$A$ form crystal" =

$$\frac{A \text{ form crystal}}{A \text{ form crystal} + B \text{ form crystal}} \times 100$$

Figure 4:
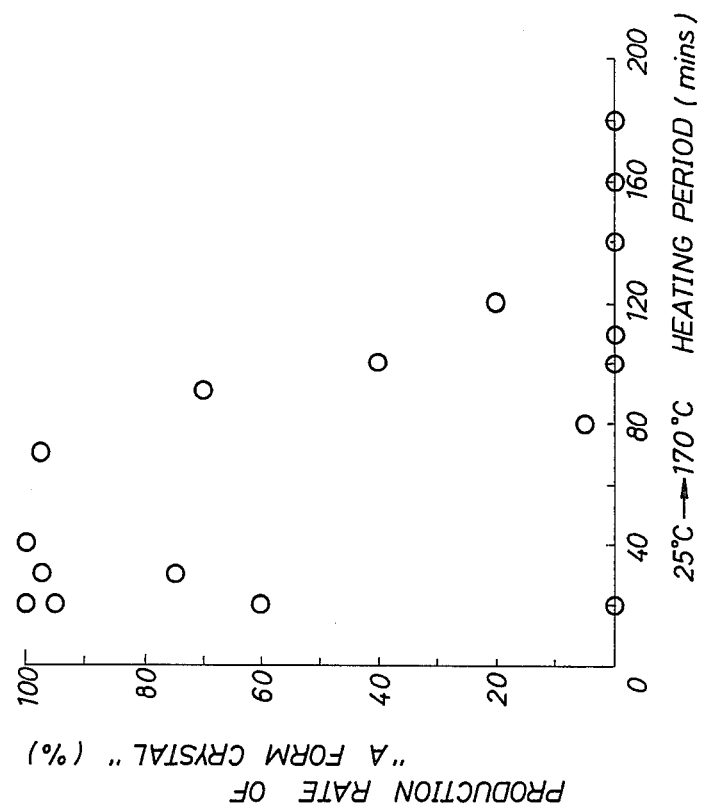
FIG. 4 illustrates the variation in production of "A form" crystal of oxytitanium phthalocyanine as the heating period is varied in the conventional production method.

As seen from FIG. 4, the production rate of A form crystal tends to increase as the heating period of time is shortened. However, such a tendency will largely vary and this is not a satisfactory method for preparing the A form crystal of oxytitanium phthalocyanine. In addition, the temperature rise in such a short period of time will require a larger reaction vessel and therefore be disadvantageous from the viewpoint of industrial production.

EXAMPLES

The present invention will further be illustrated by the following examples together with the comparative examples and applicative examples. But, these examples are not intended to limit the invention.

EXAMPLE 1

Into a one liter reaction flask fitted with a thermometer, a stirrer and a reflux condenser, 600 ml of α-chloronaphthalene was charged, and the flask was heated to 170° C. on an oil bath. Then, 92 g (0.718 mole) of o-phthalodinitrile and 20 ml (0.182 mole) of titanium tetrachloride were added and the whole mixture was heated to 200° C. over 10 minutes under stirring. The mixture was further stirred at this temperature for 5 hours, then cooled to 130° C. and filtered. The resulting wet cake of dichlorotitanium phthalocyanine was washed with 400 ml of α-chloronaphthalene heated at 130° C. After adding 800 ml of methanol, the mixture was suspended and washed under stirring at 60° C. for 2 hours.

The resulting cake was filtered off. Further, 800 ml of deionized water was added and suspended and washed under stirring at 90° C. for 2 hours. The resulting cake was filtered off. This hydrolysis procedure was repeated twice. Thus, a wet cake of oxytitanium phthalocyanine was obtained.

N-Methylpyrrolidone (700 ml) was added to the wet cake, and the mixture was suspended and washed under stirring at 150° C. for 2 hours. This washing procedure was repeated twice. To the resulting wet cake there was added 800 ml of methanol and the mixture was suspended and washed under stirring at 60° C. for 2 hours. The resulting cake was filtered off and dried. Thus, 76 g of purified oxytitanium phthalocyanine was obtained with a yield of 74%.

The powder X-ray diffraction pattern was identical to that shown in FIG. 1 and therefore this crystal was identified as the A form.

Elementary analysis of this crystal was as follows:

|  | C | H | N | Cl |
|---|---|---|---|---|
| Theoretical (%): | 66.68 | 2.80 | 19.44 | 0 |

| -continued |  |  |  |  |
|---|---|---|---|---|
|  | C | H | N | Cl |
| Found (%): | 66.51 | 2.77 | 19.58 | 0.43 |

EXAMPLES 2–4

The procedures of Example 1 were repeated except that in the condensation reaction, o-phthalodinitrile and titanium tetrachloride were added under respective conditions indicated in Table below and different reaction solvents shown in Table below were used. The results are shown in the following Table.

TABLE

| Ex. No. | Reaction Solvent | Addition Condition | | Oxytitanium Phthalocyanine | |
|---|---|---|---|---|---|
|  |  | o-Phthalo-dinitrile | Titanium Tetrachloride | Yield (g) | Crystal Form |
| 2 | α-Chloro-naphthalene | Preliminarily added to reaction solvent | Added at 170° C. | 74 | A |
| 3 | α-Chloro-naphthalene | Preliminarily added to reaction solvent | Mixed to α-chloronaph-thalene (100 ml) and added at 200° C. | 76 | A |
| 4 | α-Methyl-naphthalene | Added at 200° C. | Preliminarily added to reaction solvent | 73 | A |

COMPARATIVE EXAMPLE

To prepare oxytitanium phthalocyanine the procedures of Example 1 were repeated except that in the condensation reaction, after α-chloronaphthalene was heated to 100° C., o-phthalodinitrile and titanium tetrachloride were added, and the mixture was then heated to 200° C. and reacted. The yield was 73 g.

Figure 5:
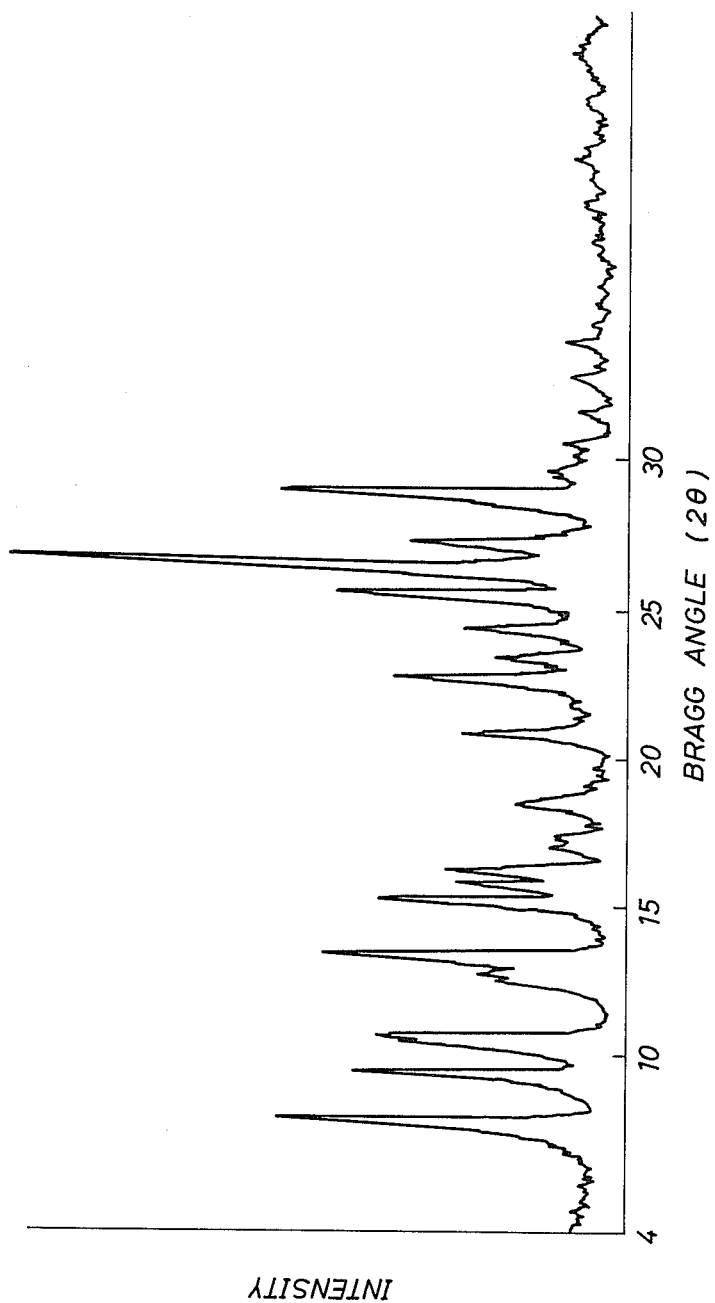
FIG. 5 illustrates the X-ray diffraction pattern of oxytitanium phthalocyanine produced using a comparative method, indicating that a mixture of both the A and B crystal forms are are present.

The powder X-ray diffraction pattern of the product is shown in FIG. 5. As will be apparent from FIG. 5, the pattern has characteristic peaks at Bragg angles of 7.6°, 9.3°, 26.3° and 28.6°. Thus, the product was identified as a mixture of the A and B forms of oxytitanium phthalocyanine crystal.

APPLICATIVE EXAMPLE (ELECTROPHOTOGRAPHIC PHOTORECEPTOR)

The A form crystal (0.4 g) of oxytitanium phthalocyanine prepared in Example 1 and polyvinyl butyral (0.2 g) were dispersed in 4-methoxy-4-methyl-2-pentanone (30 g) with the aid of a sand grinder. By using a film applicator, the dispersion was applied on an aluminum layer which had been vacuum deposited on a polyester film substrate. After drying, a charge generating layer was formed on the Al layer. The amount of the dispersion applied was 0.3 g/m².

The charge generating layer was overcoated with a charge transport layer of 17 μm in thickness which comprised 70 parts of N-methyl-3-carbazole carbaldehyde diphenylhydrazone, 2 parts of p-nitrobenzoyloxy benzalmalononitrile and 100 parts of polycarbonate resin (Mitsubishi Chemical Industries, Ltd., NOVAREX 7025A) to prepare an electrophotographic photoreceptor having a laminate photosensitive layer.

The sensitivity of the photoreceptor, half decay exposure ($E_{\frac{1}{2}}$), was measured by an electrostatic characteristic analyser (Kawaguchi Denki Seisaku-jo K.K., Japan, Model SP-428). Thus, the photoreceptor was negatively charged by corona discharge with an applied voltage which was set such that the corona current should be 22 μA in the dark, and exposed to white light with an illuminance of 5 lux. The quantity of light exposure required for decay of the surface potential from −450 V to −225 V, i.e. $E_{\frac{1}{2}}$, was determined to be 0.64 lux.sec. In this case, the initial surface potential of the photoreceptor was −645 V, the dark decay was 19 V/sec, and the surface potential at 10 seconds after exposure (i.e., the remaining potential) was −17 V.

The photoreceptor was then subjected to repeated runs, one cycle of which consisted of charging the receptor, and exposing it to white light with a dark decay of 0.4 seconds and an illuminance of 400 lux for 2.0 seconds, so as to evaluate the repeat endurance properties. After 2,000 cycle runs, the initial surface potential was 98% of the value found at the start of the course of these experiments and the remaining potential was −26 V.

As seen from the above, the A form crystal of oxytitanium phthalocyanine has quite excellent electrophotographic properties and is especially useful as a photosensitive material for semiconductor lasers.

Though only some specific embodiments of this invention have been described, various variations and modifications can be made by those skilled in the art. It should be understood that such modifications and changes are encompased within the scope of this invention.

What is claimed is:

1. A process for preparing the A form crystal of oxytitanium phthlocyanine comprising effecting a condensation reaction of o-phthalodinitrile with titanium tetrachloride in an organic solvent at a temperature of 170° to 300° C. followed by hydrolysis, wherein the temperature of said organic solvent is 160° to 300° C. when the o-phthalodinitrile and titanium tetrachoride are brought into contact.

2. The process in accordance with claim 1 wherein the o-phthalodinitrile and titanium tetrachloride are added to an organic solvent which is at a temperature of 160° to 300° C., and the condensation reaction is then carried out.

3. The process in accordance with claim 1 wherein the titanium tetrachloride is added to a mixture of an organic solvent with o-phthalodinitrile, wherein the mixture is at a temperature of 160° to 300° C., and the condensation reaction is then carried out.

4. The process in accordance with claim 1 wherein a first mixture of titanium tetrachloride with a small amount of an organic solvent is added to a second mixture of an organic solvent with o-phthalodinitrile, wherein the second mixture is initially at a sufficiently high temperature such that the temperature of said second mixture after the addition of said first mixture is 160° to 300° C., and the condensation reaction is then carried out.

5. The process in accordance with claim 1 wherein the o-phthalodinitrile is added to a mixture of an organic solvent with titanium tetrachloride, wherein the mixture is at a temperature of 160° to 300° C., and the condensation reaction is then carried out.

6. The process in accordance with claim 1 wherein the A form crystal of oxytitanium phthalocyanine produced thereby shows strong diffraction peaks at Bragg angles (2θ) of 9.3° and 26.3° in the powder X-ray diffraction pattern.

7. The process in accordance with claim 1 wherein the A form crystal of oxytitanium phthalocyanine produced thereby has the powder X-ray diffraction pattern substantially as illustrated in FIG. 1.

8. The process in accordance with claim 1 wherein the temperature of said organic solvent is 170° to 250° C.

9. The process in accordance with claim 2 wherein the temperature of said organic solvent is 170° to 250° C.

10. The process in accordance with claim 3 wherein the temperature of said mixture is 170° to 250° C.

11. The process in accordance with claim 4 wherein the temperature of said second mixture after the addition is 170° to 250° C.

12. The process in accordance with claim 5 wherein the temperature of said mixture is 170° to 250° C.

* * * * *

UNITED STATES PATENT AND TRADEMARK OFFICE
CERTIFICATE OF CORRECTION

PATENT NO. : 4,777,251
DATED : October 11, 1988
INVENTOR(S) : M. Tanaka, T. Miyagawa and I. Takagishi It is certified that error appears in the above—identified patent and that said Letters Patent is hereby corrected as shown below:

ON THE TITLE PAGE,

Section #73, change the second Assignee name from "Waco Pure Chemical Industries, Ltd." to --Wako Pure Chemical Industries, Ltd.--.

Signed and Sealed this

Twenty-third Day of May, 1989

Attest:

DONALD J. QUIGG

Attesting Officer

Commissioner of Patents and Trademarks